United States Patent
Jajtic et al.

(10) Patent No.: US 7,928,613 B2
(45) Date of Patent: Apr. 19, 2011

(54) MACHINE WITH DIRECT DRIVE

(75) Inventors: Zeljko Jajtic, München (DE); Markus Knorr, Augsburg (DE); Gerhard Matscheko, Sternberg (DE); Wolfgang Wolter, Herbertshausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/366,858

(22) Filed: Feb. 6, 2009

(65) Prior Publication Data

US 2009/0206684 A1 Aug. 20, 2009

(30) Foreign Application Priority Data

Feb. 7, 2008 (EP) ..................................... 08002302

(51) Int. Cl.
*H02K 41/00* (2006.01)
(52) U.S. Cl. .................................................. 310/12.31
(58) Field of Classification Search .... 310/12.01–12.33, 310/15
See application file for complete search history.

(56) References Cited

U.S. PATENT DOCUMENTS

| | | | | |
|---|---|---|---|---|
| 4,594,520 A | * | 6/1986 | Miwa et al. | 310/12.27 |
| 5,203,432 A | * | 4/1993 | Grinaski | 187/251 |
| 5,297,658 A | * | 3/1994 | Grinaski et al. | 187/251 |
| 5,751,076 A | * | 5/1998 | Zhou | 310/12.11 |

FOREIGN PATENT DOCUMENTS

| | | |
|---|---|---|
| DE | 28 22 993 A1 | 11/1979 |
| DE | 93 06 975 U1 | 6/1994 |
| DE | 10 2006 010 198 A1 | 9/2007 |
| WO | WO 2004/068678 A1 | 8/2004 |

* cited by examiner

*Primary Examiner* — Nguyen N Hanh
(74) *Attorney, Agent, or Firm* — Henry M. Feiereisen; Ursula B. Day

(57) ABSTRACT

A machine includes a moving part and a direct drive for moving the moving part. The direct drive includes a stator and an armature unit which interacts with the stator. A coupling device couples the armature unit to the moving part to allow a movement of the moving part in relation to the armature unit. The direct drive further includes a spacer device to maintain a distance between an active region of the stator and an active region of the armature unit, thereby defining the air gap between the stator and the armature unit.

11 Claims, 5 Drawing Sheets

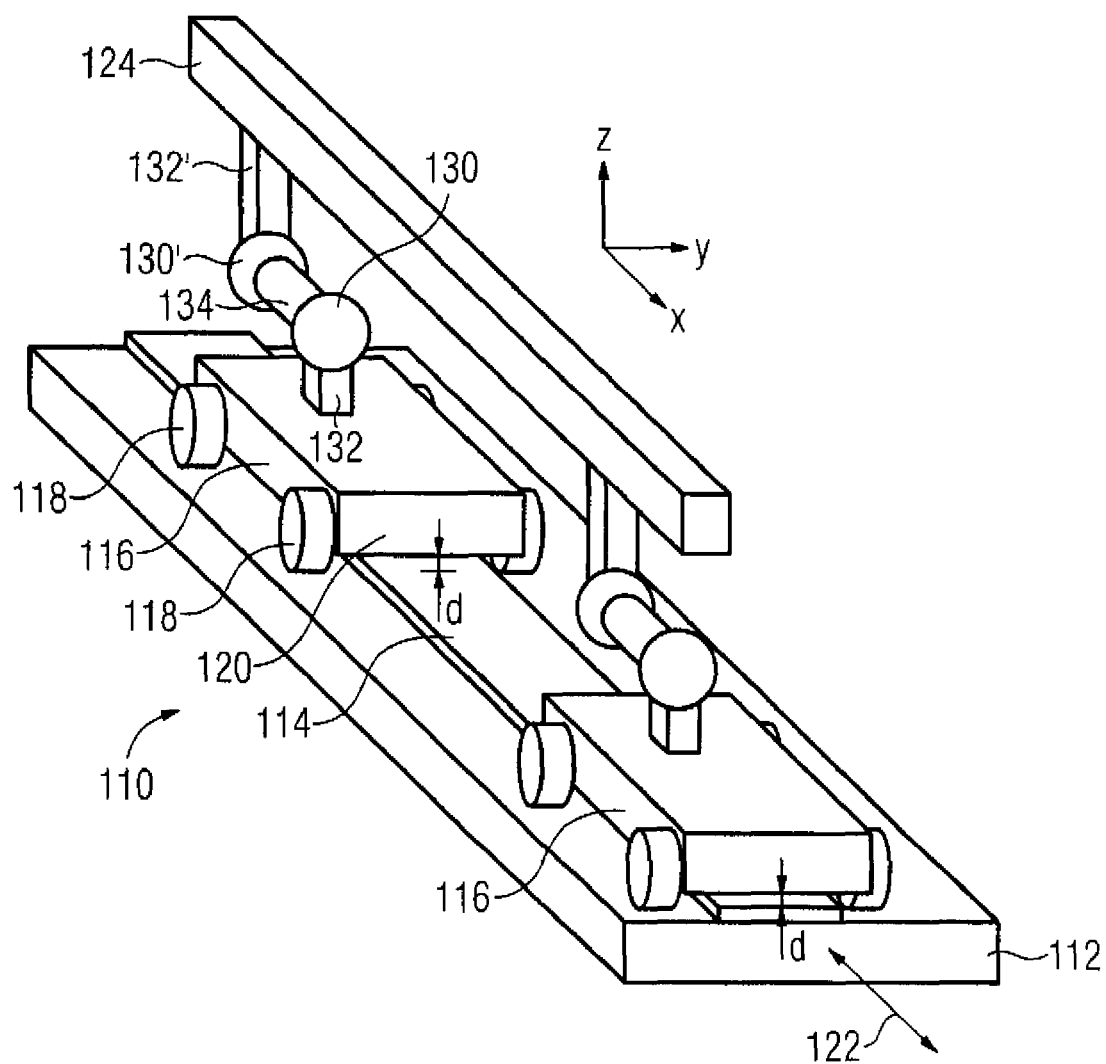

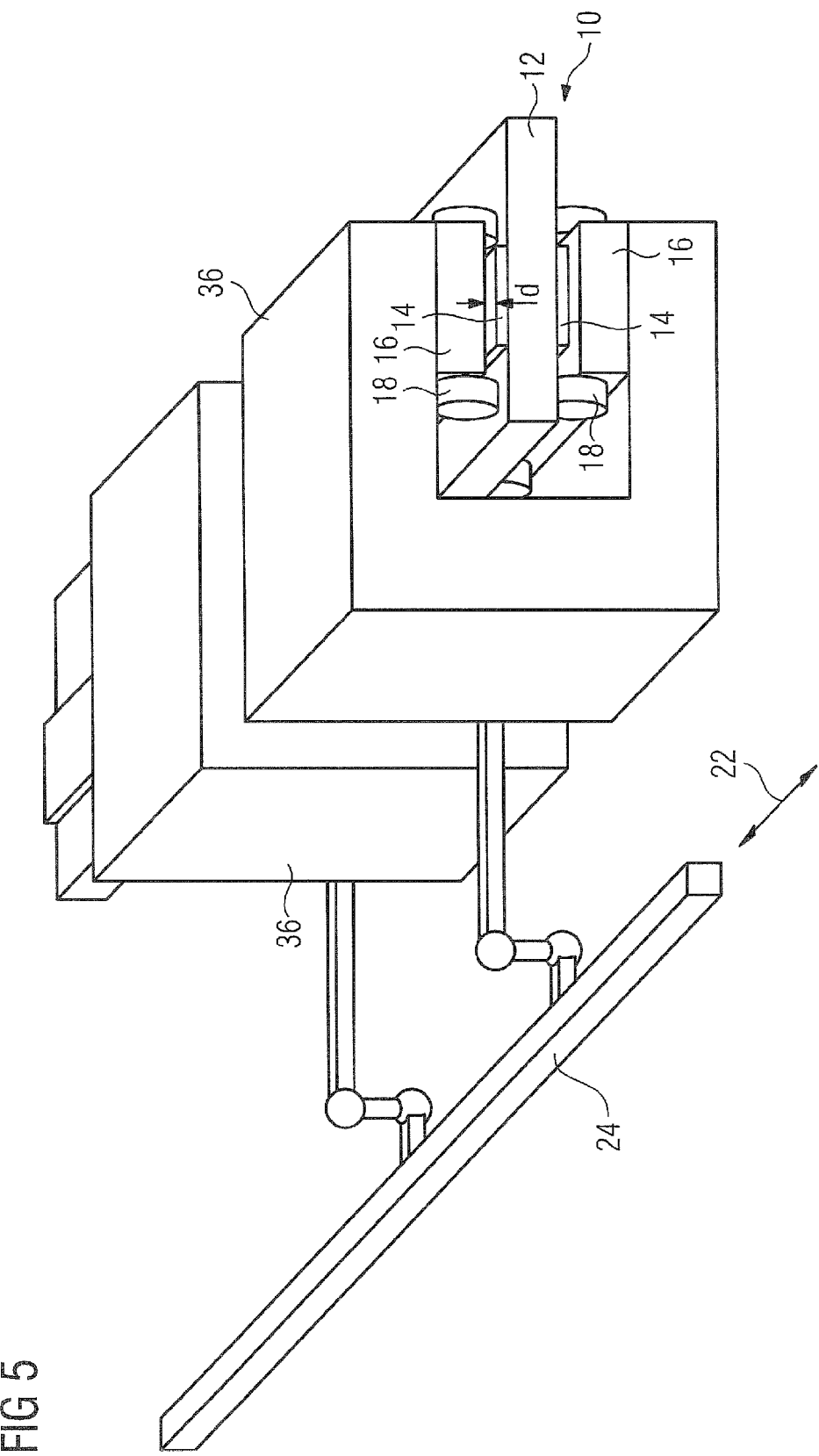

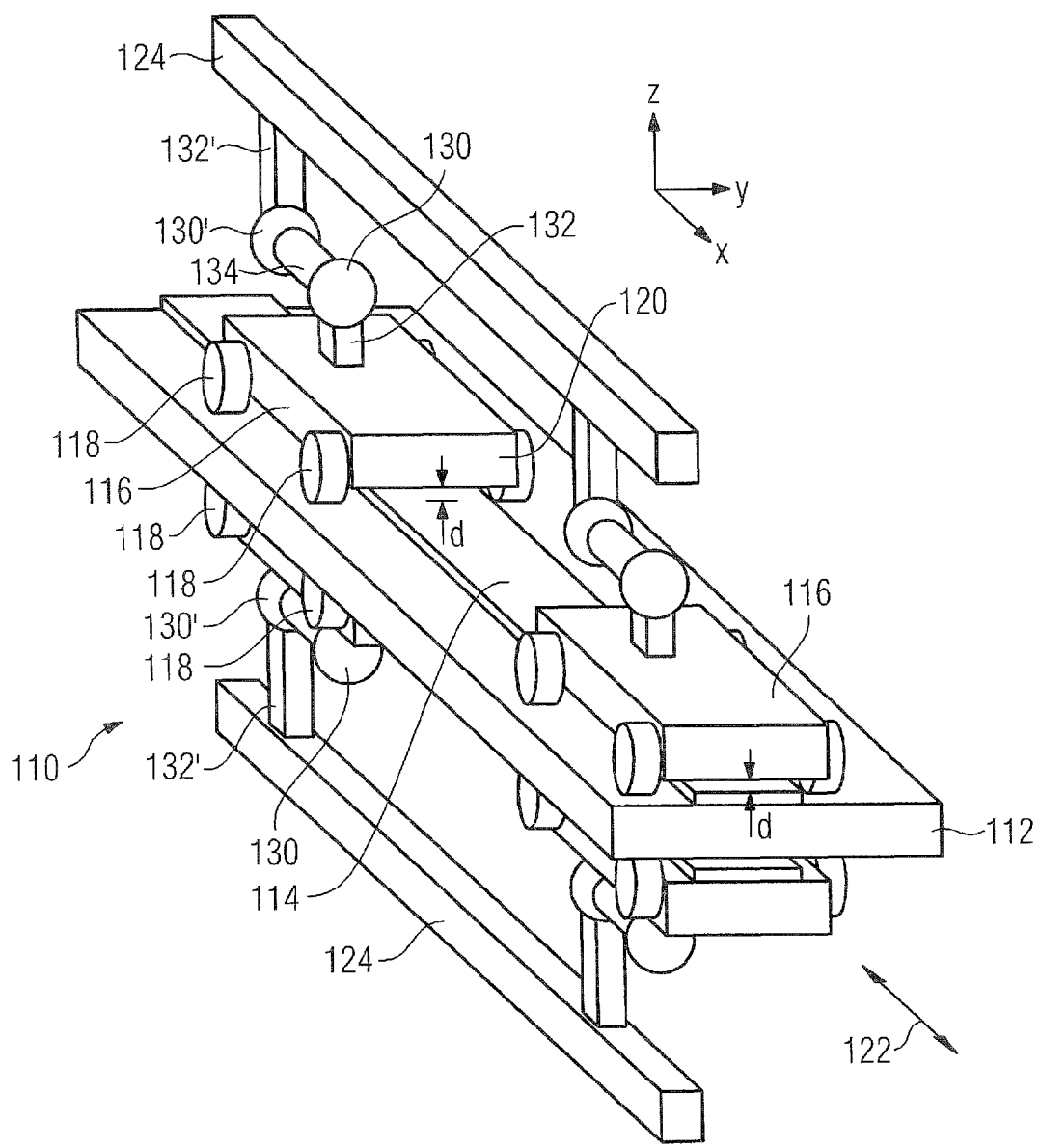

MACHINE WITH DIRECT DRIVE

CROSS-REFERENCES TO RELATED APPLICATIONS

This application claims the priority of European Patent Application, Serial No. 08002302, filed Feb. 7, 2008, pursuant to 35 U.S.C. 119(a)-(d), the content of which is incorporated herein by reference in its entirety as if fully set forth herein.

BACKGROUND OF THE INVENTION

The present invention relates to a machine in which a moving part is moved by means of a direct drive.

Nothing in the following discussion of the state of the art is to be construed as an admission of prior art.

A direct drive is frequently provided in the form of a so-called built-in motor. The machine manufacturer receives the stator and the armature (stator and rotor) of the machine, the armature not yet being definitively mounted with respect to the stator. Rather, the actual mounting of the armature with respect to the stator takes place within the machine. The stator is connected to a first other component of the machine and the armature to a second other component of the machine, usually rigidly. The second other component of the machine is now mounted relative to the first other component of the machine, thus producing an indirect mounting of the armature with respect to the stator. If an electric motor is used as a direct drive, operation of the motor is dependent on how accurately a pre-determined air gap is maintained between stator and armature, in particular between the active regions of the stator and the armature, in which the acting magnetic fields are provided. The mounting of the machine often proves to be inadequate to adjust the air gap precisely. This problem is compounded, when large machines are involved. If a rotary motor is used in which the rotor must have a diameter of three to five meters, the mounting in a machine of the type described above represents a challenge. If the machine has a diameter of as much as 20 to 50 meters, which can be the case with modern telescopes and also wind turbines, previous mechanical engineering concepts prove to be unsuitable.

It would therefore be desirable and advantageous to provide an improved machine with direct drive to obviate prior art shortcomings.

SUMMARY OF THE INVENTION

According to one aspect of the present invention, a machine includes a moving part, a direct drive for moving the moving part, with the direct drive including a stator, an armature unit interacting with the stator, and a spacer device to maintain a distance between an active region of the stator and an active region of the armature unit, and a coupling device coupling the armature unit to the moving part to allow a movement of the moving part in relation to the armature unit.

The present invention resolves prior art problems by employing a coupling device by which the armature unit, e.g. the rotor in a rotary machine or a plurality of armature segments in a linear motor, is coupled to the moving part and so constructed as to enable a relative movement of the moving part with respect to the armature unit. The direct drive has a spacer device for maintaining a distance between the active region of the stator and the active region of the armature unit. As the armature unit is not rigidly connected to the moving part, the mounting provided in the machine outside the direct drive no longer has to directly ensure the air gap between the part of the body of the armature unit on which the active region is formed and the part of the body of the stator on which its active region is formed. Rather, the invention is based on the knowledge that the armature unit is in any case attracted to the stator due to the magnetic fields. Because relative movement is enabled between armature unit and moving part, the armature unit can move independently from the mounting provided for the moving part as a result of this attractive force. At the same time, the spacer device ensures that an accurately defined air gap is maintained. The armature unit follows the attractive force until the spacer device prevents a further attraction between stator and armature unit.

According to another feature of the present invention, the spacer device may include at least one pair of supporting rollers which are attached to the armature unit or to a segment of the armature unit for the purpose of maintaining a proper distance. The supporting rollers are rotatably mounted on a body of the armature unit or of the respective segment of the armature unit on which the active region is located. The supporting rollers can roll directly along the stator. The body is thereby maintained at a fixed distance from the stator.

The spacer device can also include a rail system. At least one rail is hereby attached to the stator, with the armature unit running along the rail in a suitable manner. For this purpose, a recess can be provided in the armature unit or in one segment of the armature unit. Currently preferred is however the provision of a guide shoe which can slide over the rail.

It is conceivable that the coupling device enables a relative movement of the moving part with respect to the armature unit in any direction. However, a relative movement in the direction of motion of the armature unit should be prevented, as otherwise it is possible that the moving part does not undergo a defined movement. In other words, the coupling device should then enable a relative movement only in such a direction (or in such directions) which is different from the direction of motion of the armature unit. With a linear motor, the relative movement is therefore only possible in a direction perpendicular to the linear movement. With a rotary movement, the relative movement can have an axial and a radial component but not a tangential component in relation to the armature which is designed as a rotor.

A coupling device, which couples the moving part to the armature unit in a flexible manner, can easily be realized. The coupling device may include at least one flat strip-shaped metal element which is therefore bendable to and fro. Such a metal element can be designed in the form of a plate or a plate structure with a plurality of plates.

A required relative movement, in particular only in directions which differ from the direction of motion of the armature unit, can also be achieved when a joint is used, e.g. a ball joint. It is possible to couple two ball joints to one another by means of a connecting rod, wherein, in an initial state, the connecting rod extends parallel to the direction of motion of a linear motor.

The invention can be used for any type of machines with a moving part which is driven by a direct drive, including large machines, but also smaller machines. In the case of a telescope or wind turbine, the direct drive will generally be a rotary direct drive. The invention can also be applied when the direct drive is an electric linear motor. In this case, a symmetrical embodiment proves to be advantageous in which the stator has an element which extends in a straight line and wherein armature units move past opposite sides of the element which extends in a straight line (double-sided arrangement). Each of the armature units may be coupled to a moving part and the moving parts are rigidly connected to one another. Coupling is hereby realized in the manner described above, i.e. by means of a coupling device which enables a relative movement of the moving part of the armature unit for each of the two armature units, and in each case a spacer device, e.g. the aforementioned supporting rollers, is also provided on both of the armature units. The two armature units can be coupled due to the fact that the moving parts are rigidly connected to one another. This enables the whole arrangement to be stabilized. Furthermore, with such a double-sided arrangement, stress on components can be reduced, as the forces acting on the two armature units cancel one another out. When the supporting rollers are used, for example, the supporting rollers of the individual armature units are subjected to less stress than in the case of a single-sided arrangement with only a single armature unit on one stator.

According to another aspect of the present invention, a machine includes a non-moving part, a moving part placed in opposite relationship to the non-moving part, a direct drive for moving the moving part, with the direct drive including a stator unit, an armature interacting with the stator, and a spacer device to maintain a distance between an active region of the armature and an active region of the stator unit, and a coupling device coupling the stator unit to the non-moving part and allowing a deflection of the non-moving part with respect to the stator unit.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a schematic representation of yet another embodiment of a machine according to the present invention;

FIG. 5 is a schematic representation of the machine of FIG. 3 with illustration of a connection of a moving part to a rigid body; and FIG. 6 is a schematic representation of the machine of FIG. 4 with illustration of two stator units and their connections to two non-moving parts, respectively.

DETAILED DESCRIPTION OF PREFERRED EMBODIMENTS

Figure 1:
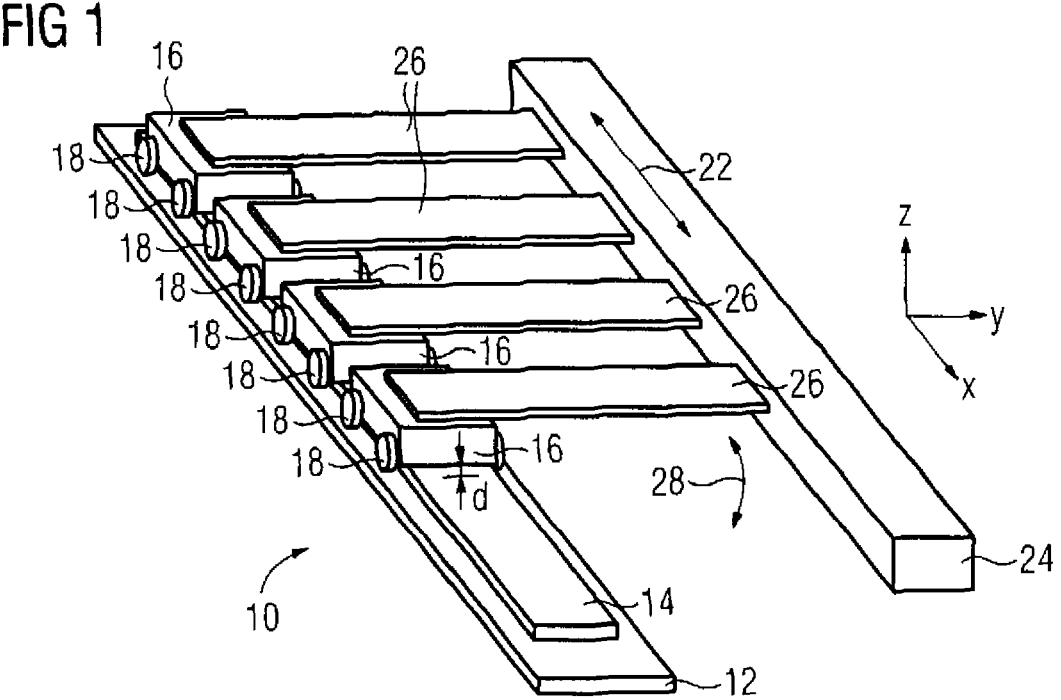
FIG. 1 is a schematic representation of one embodiment of a machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the embodiments of the invention described below, a component in a machine is to be moved by means of an electric linear motor with armature and stator. The invention is also applicable to machines in which a rotary direct drive is used.

An electric linear motor has a primary component and a secondary component. Usually, a permanent magnet is provided on the secondary component, while a core made of ferromagnetic material, usually iron, is provided on the primary component, as well as coils which are wound around the core. Current is passed through the coils, and the magnetic field which is produced by the current and strengthened by the iron core interacts with the magnetic field of the permanent magnets of the secondary component and a thrust is therefore produced between primary and secondary component in the direction of motion.

In principle, both parts of a linear motor can be designed to be either moving or fixed—depending on what is structurally necessary in a specific application.

In the embodiments described below with reference to FIGS. 1 to 3, it is assumed that in the electric linear motor the secondary component is fixed and the primary component or a plurality of primary components is/are moving. The secondary component therefore corresponds to the stator, while a plurality of primary components forms an armature unit.

Turning now to the drawing, and in particular to FIG. 1, there is shown a schematic representation of one embodiment of a machine according to the present invention. The secondary component is designated with 10 and has a steel plate 12 to which is attached a magnet track 14, that is to say a series of permanent magnets with alternate polarity (north-south-north etc.). The steel plate 12 provides the magnetic return path. A plurality of primary components 16 can move relative to the secondary component 10. The coils of the primary components 16 are not shown. Supporting rollers 18, which enable the primary components 16 to roll on the steel plate 12, are attached to the primary components 16. The actual primary component body 20 to which the supporting rollers 18 are fixed is maintained at a predetermined distance d from the magnet track 14 on account of the presence of the supporting rollers 18, while the primary component 16 moves in the directions shown by the arrows 22. Usually, in a machine, the primary components 16 do not always move in the same direction, but also move back in the opposite direction.

It is now a question of moving a moving part 24 by means of the direct drive, i.e. by the interaction of secondary component 10 and primary components 16. For this purpose, the moving part 24 is coupled to the primary components 16. There is no rigid connection here as provided in the prior art, but a flexible connection which enables the moving part 24, which is shown in FIGS. 1 and 2 as linear slides, to move in directions which are different from the directions of motion shown by the double arrow 22. When the primary components 16 and therefore also the moving part 24 move along the x-axis, a relative movement of the moving part 24 with respect to the primary components 16 is enabled in the y- and z-axis.

In the embodiment according to FIG. 1, this is enabled on account of the coupling of the moving part 24 to the primary components 16 by strip-shaped metal elements 26, which can be bent as shown by the arrow 28. In the embodiment according to FIG. 2, the coupling device comprises two ball joints 30 and 30', wherein the ball joint 30 is connected to the primary component 16 by means of a rigid connection 32 and the ball joint 30' is likewise connected to the moving part 24 by means of a rigid connection 32'. A connecting rod 34, which is rigid, engages in the ball joints. As the connecting rod 34 is rigid, relative movement is not possible in the x-direction, i.e. that shown by the arrows 22, between moving part 24 and primary components 16, so that the drive force is optimally transmitted from the primary components 16 to the moving part 24. On the other hand, the moving part 24 can move relative to the primary components in the y- and z-direction and in doing so compensate for unevenness in the mounting, for example, or even out-of-balance. It is therefore not necessary to place such high demands on the mounting of the moving part 24. In particular, the mounting of the moving part 24 does not have to directly set the size d of the air gap. Rather, there is a magnetic attractive force between the magnet track 14 and the body 20 of the magnet component 16 in operation, so that the supporting rollers 18 roll along the steel plate 12 in all cases and the air gap definitively has the size d. The air gap therefore does not become smaller or larger without the mounting of the moving part 24 having to define this air gap d.

Figure 2:
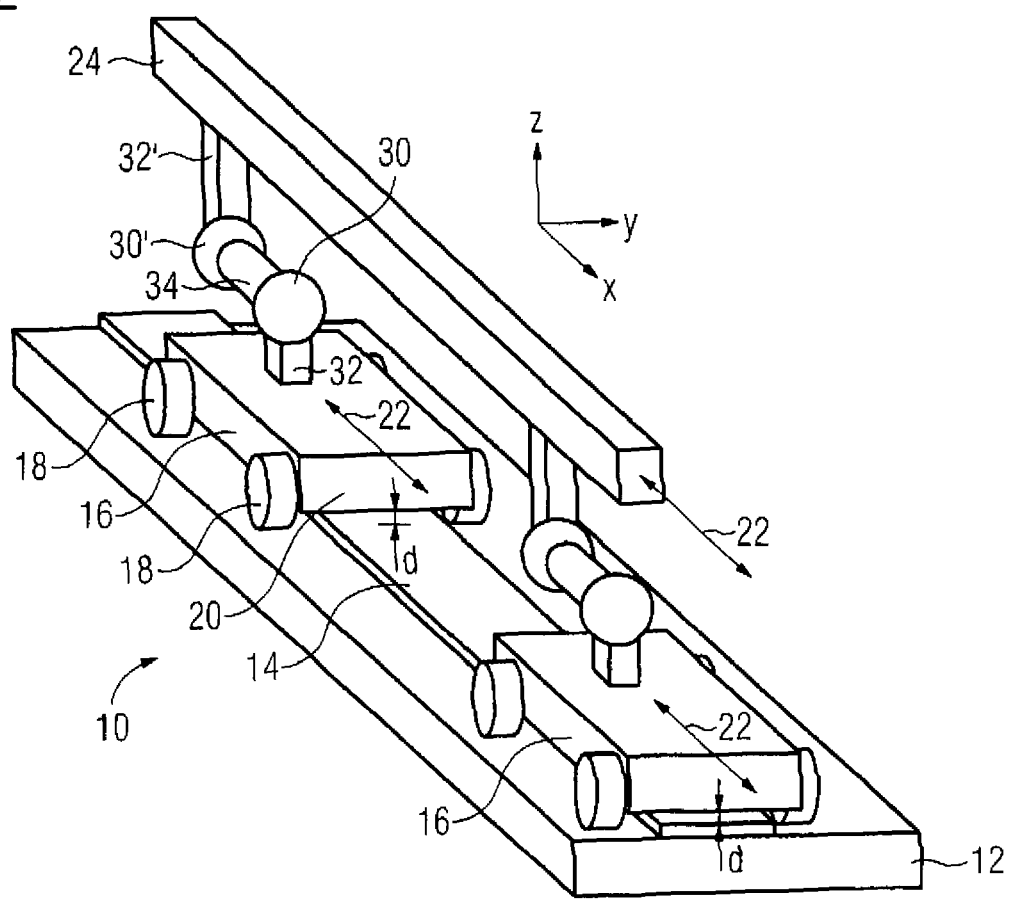
FIG. 2 is a schematic representation of a further embodiment of a machine according to the present invention.
Figure 3:
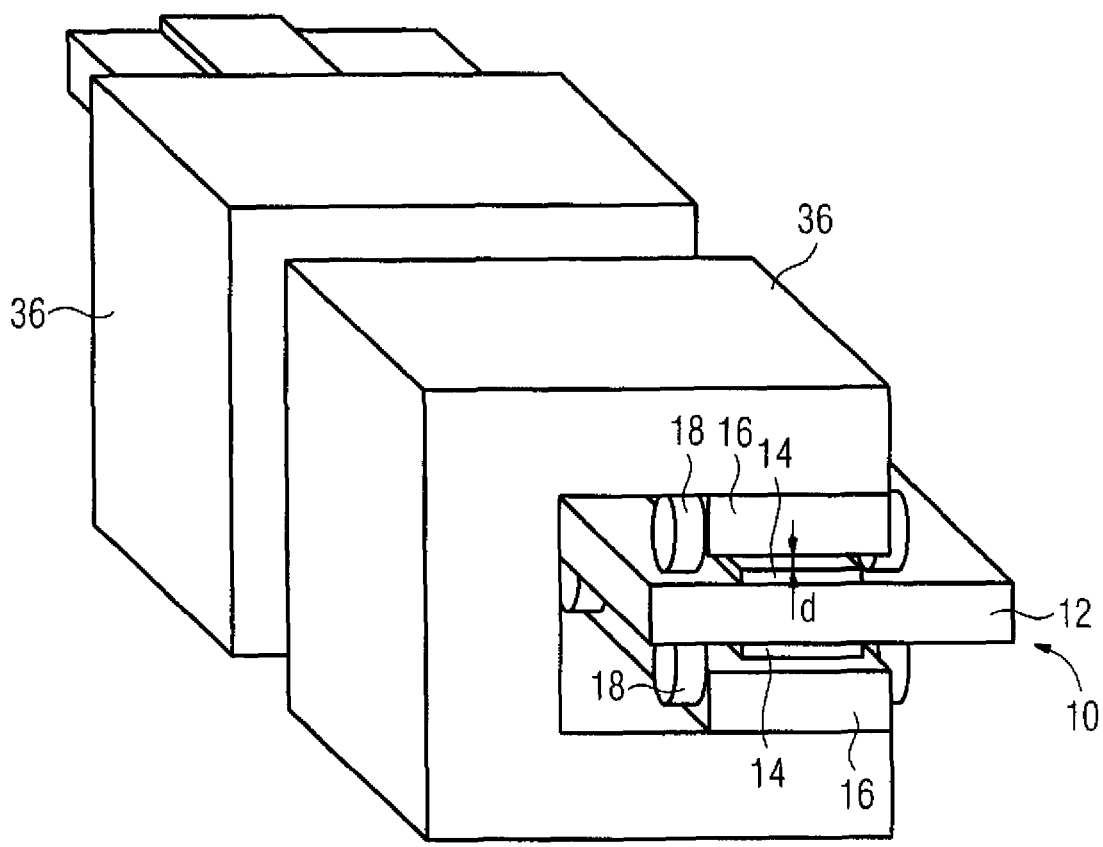
FIG. 3 is a schematic representation, on an enlarged scale, of a variation of the machine of FIG. 2.

The embodiment of FIG. 2 can in particular be realized in a symmetrical arrangement. Such an arrangement is shown in FIGS. 3 and 5. Here, the secondary component 10 is designed symmetrically, i.e. magnet tracks 14 are located on opposite sides of the steel plate 12 and in each case primary components 16 move along the opposite sides. In the embodiment according to FIG. 3, the connection to the moving part 24 must also be ensured in the manner shown in FIG. 2 and illustrated in FIG. 5. In this case, on the one hand, the moving parts 24 of the top armature unit in FIG. 3 and, on the other hand the bottom armature unit shown in FIG. 3 should be connected to a U-shaped body 36 which, for its part, is rigid so that the moving parts 24 are rigidly connected to one another. A relative movement of the one moving part 24 relative to the respective primary component 16 therefore results directly in a relative movement of the other moving part 24 relative to the respective primary component 16. The arrangement of FIG. 3 therefore exerts symmetrical forces on the top and bottom primary components 16 and therefore on the supporting wheels 18 top and bottom. This makes the whole arrangement particularly stable. In the symmetrical embodiment according to FIG. 3, the supporting wheels 18 are in each case less loaded than if primary components 16 were to move over only one side of the steel plate 12 with supporting wheels 18.

Due to the interaction of flexible coupling device with the ball joints 30, 30', the rigid connections 32, 32' and the connecting rod 34 on the one hand and the supporting rollers 18, which have the function of a spacer device, it is possible for a moving part to be flexibly mounted with respect to a non-moving part in a machine that is to be driven by the direct drive. The demands on the mounting in order to set the air gap d accurately are not as high as in the prior art.

In an aspect of the invention, it is also possible to reverse the function of primary component and secondary component compared with that described above. It is therefore also possible for the stator or a stator unit of the machine to be flexibly coupled to a non-moving part of the machine, opposite which a moving part of the machine is mounted.

This reversal is shown in FIG. 4. In the following description, parts corresponding with those in FIGS. 2 and 3 will be identified by corresponding reference numerals, each increased by "100".

Instead of the primary components 116 now moving and being part of an armature unit, in the embodiment of FIG. 4, the secondary component 110 is the armature and the primary components 116 form a stator unit. The difference is shown by placing the arrow 122 in the vicinity of the armature 110. In particular, the component 124, unlike the component 24 of FIG. 2, is not a moving component but is a non-moving component of the machine. On the other hand, the armature 110 is connected to a moving component of the machine but has not been shown in FIG. 4 for the sake of simplicity.

The armature 10 rolls to and fro in the direction of the double arrow 122 past the stator unit with the primary components 116, wherein the supporting rollers 18 turn. FIG. 6 shows a configuration with two stator units connected to the non-moving parts 124, respectively.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machine, comprising:
   a moving part;
   a direct drive for moving the moving part, said direct drive comprising a stator, an armature unit interacting with the stator, and a spacer device to maintain a distance between an active region of the stator and an active region of the armature unit; and
   a coupling device coupling the armature unit to the moving part to allow a movement of the moving part in relation to the armature unit, said coupling device including at least one straight element connecting the armature unit to the moving part and extending perpendicular to a direction of motion of the armature.

2. The machine of claim 1, wherein the spacer device includes at least one pair of supporting rollers attached to the armature unit or to a segment of the armature unit.

3. The machine of claim 1, wherein the coupling device is constructed to permit a movement of the moving part in relation to the armature unit in at least one direction which is different from a direction of motion of the armature unit.

4. The machine of claim 1, wherein the at least one straight element is a flat strip-shaped metal element.

5. The machine of claim 1, wherein the direct drive is designed in the form of an electric linear motor.

6. The machine of claim 5, wherein the stator has an element which extends in a straight line and has opposite sides, said armature unit being provided on one of the opposite sides of the element and connected to the movable part, said direct drive including a further said armature unit being provided on the other one of the opposite sides of the element and connected to a further said movable part, and a body rigidly connecting the moving parts to one another.

7. The machine of claim 6, wherein the body has a U-shaped configuration.

8. A machine comprising:
   a moving part;
   a direct drive for moving the moving part, said direct drive comprising a stator, an armature unit interacting with the stator, and a spacer device to maintain a distance between an active region of the stator and an active region of the armature unit; and
   a coupling device coupling the armature unit to the moving part to allow a movement of the moving part in relation to the armature unit, said coupling device having two joints and a connecting rod to connect the joints to one another, with one of the joints connected to the armature and the other one of the joints connected to the moving part, and with the connecting rod extending in parallel relationship to a direction of motion of the armature unit.

9. The machine of claim 8, wherein the each said joint is a ball joint.

10. A machine, comprising:
a non-moving part;
a moving part placed in opposite relationship to the non-moving part;
a direct drive for moving the moving part, said direct drive comprising a stator unit, an armature interacting with the stator, and a spacer device to maintain a distance between an active region of the armature and an active region of the stator unit; and
a coupling device coupling the stator unit to the non-moving part and allowing a deflection of the non-moving part with respect to the stator unit.

11. The machine of claim 10, wherein the direct drive is designed in the form of an electric linear motor, said armature having an element which extends in a straight line and has opposite sides, said stator unit being provided on one of the opposite sides of the element and connected to the non-moving part, said direct drive including a further said stator unit being provided on the other one of the opposite sides of the element and connected to the non-moving part, wherein the non-moving parts are rigidly connected to one another.

* * * * *

UNITED STATES PATENT AND TRADEMARK OFFICE
CERTIFICATE OF CORRECTION

| | | |
|---|---|---|
| PATENT NO. | : 7,928,613 B2 | Page 1 of 1 |
| APPLICATION NO. | : 12/366858 | |
| DATED | : April 19, 2011 | |
| INVENTOR(S) | : Zeljko Jajtic et al. | |

It is certified that error appears in the above-identified patent and that said Letters Patent is hereby corrected as shown below:

On the Title page:

Item [75] Inventors:

After Gerhard Matscheko, replace "Sternberg" with --Starnberg--;

Column 7, claim 9, line 3: after "wherein" delete "the".

Signed and Sealed this
Thirty-first Day of May, 2011

David J. Kappos
*Director of the United States Patent and Trademark Office*